United States Patent
Smythe, Jr.

(10) Patent No.: US 7,165,373 B2
(45) Date of Patent: Jan. 23, 2007

(54) DRYWALL FINISHING SYSTEM

(75) Inventor: Timothy D. Smythe, Jr., Bend, OR (US)

(73) Assignee: Structus Building Technologies, Inc, Bend, OR (US)

( * ) Notice: Subject to any disclaimer, the term of this patent is extended or adjusted under 35 U.S.C. 154(b) by 0 days.

(21) Appl. No.: 10/706,433

(22) Filed: Nov. 12, 2003

(65) Prior Publication Data

US 2004/0093816 A1    May 20, 2004

Related U.S. Application Data

(63) Continuation of application No. 10/113,851, filed on Mar. 29, 2002, now abandoned, which is a continuation-in-part of application No. 09/539,402, filed on Mar. 31, 2000, now abandoned, which is a continuation-in-part of application No. 09/191,861, filed on Nov. 12, 1998, now Pat. No. 6,148,573, which is a continuation-in-part of application No. 08/832,470, filed on Apr. 2, 1997, now abandoned, and a continuation-in-part of application No. 08/718,137, filed on Sep. 18, 1996, now abandoned, which is a continuation-in-part of application No. 08/544,339, filed on Oct. 17, 1995, now abandoned, said application No. 08/832,470 is a continuation-in-part of application No. 08/544,339.

(51) Int. Cl.
*E04B 1/00*         (2006.01)

(52) U.S. Cl. .................. 52/746.1; 52/287.1; 52/716.1; 52/717.03; 52/717.04; 52/717.05; 52/745.19; 156/244.11; 264/166; 264/167; 428/41.7; 428/41.8; 428/77; 428/163; 428/167; 428/174; 428/182

(58) Field of Classification Search ............... 52/287.1, 52/288.1, 255–257, 273, 254, 717.03, 717.04, 52/416–417, 745.1, 745.19, 745.21, 746.1, 52/717.01, 717.05, 717.1; 428/41.7, 41.8, 428/61, 122, 163, 167, 174, 182, 354, 77, 428/83, 85, 192, 195, 196, 131, 331, 332, 428/323, 326, 327, 481, 503, 507, 511, 288, 428/325; 156/71, 153, 243, 244.11; 264/176.1, 264/177.1, 166, 167
See application file for complete search history.

(56) References Cited

U.S. PATENT DOCUMENTS 2,590,846 A * 4/1952 Cutting ...................... 428/530
(Continued)

FOREIGN PATENT DOCUMENTS

AU            52254          1/2001

OTHER PUBLICATIONS

Co-pending U.S. Appl. No. 10/200,478, filed Jul. 20, 2002.
(Continued)

*Primary Examiner*—Jeanette E. Chapman
*Assistant Examiner*—Yvonne M. Horton
(74) *Attorney, Agent, or Firm*—Clifford Kraft

(57) ABSTRACT

A non-slip, nocoat drywall finishing system for finishing inside and outside corners of any angle, the finishing system being a pre-formed, continuously extruded trim piece comprising a semi-rigid member that can be relatively thick in the center and tapers laterally to a thin edge. An outer finishing layer of fibrous material that directly receives paint or texture. A pattern of protrusions, ridges, or grooves on the inner surface of the semi-rigid member to avoid the need for an inner material layer. To install one of the pieces, it is selected from stock and cut to length. A flat coat of mud is applied to both sides of an exterior or interior angle, and the trim piece is placed over the mud and smoothed into place. Once, the piece is in place, the edges are feathered once with a small amount of mud and a wide blade. At that point the corner is complete except for drying.

7 Claims, 5 Drawing Sheets

U.S. PATENT DOCUMENTS

| | | | |
|---|---|---|---|
| 2,904,856 A | 9/1959 | Robinson | |
| 3,090,087 A * | 5/1963 | Miller | 52/287.1 |
| 3,109,207 A * | 11/1963 | Cooper | 52/255 |
| 4,313,991 A * | 2/1982 | Lamb | 428/131 |
| 4,612,152 A * | 9/1986 | Kawabata et al. | 264/136 |
| 4,719,732 A | 1/1988 | Bernard | |
| 4,835,925 A | 6/1989 | Hoffmann, Sr. | |
| 4,863,774 A * | 9/1989 | Tucker | 428/77 |
| 4,929,474 A * | 5/1990 | Avni et al. | 427/326 |
| 4,946,372 A * | 8/1990 | Avni | 428/325 |
| 4,977,718 A | 12/1990 | Hoffman, Sr. | |
| 5,037,686 A * | 8/1991 | Conboy | 428/43 |
| 5,086,598 A | 2/1992 | Weldy | |
| 5,131,198 A | 7/1992 | Ritchie et al. | |
| RE34,547 E | 2/1994 | Weldy | |
| 5,333,433 A * | 8/1994 | Porambo et al. | 52/417 |
| RE34,929 E * | 5/1995 | Kristen | 206/524.8 |
| 5,604,001 A * | 2/1997 | Schold | 428/41.8 |
| 5,613,335 A * | 3/1997 | Rennich et al. | 52/255 |
| 5,700,586 A * | 12/1997 | Laiho et al. | 428/507 |
| 5,723,199 A * | 3/1998 | Boot | 428/158 |
| 5,778,617 A | 7/1998 | Free | |
| 5,836,122 A | 11/1998 | Rennich et al. | |
| 5,861,074 A * | 1/1999 | Wu | 156/229 |
| 6,148,573 A | 11/2000 | Smythe, Jr. | |
| 6,295,776 B1 | 10/2001 | Kunz et al. | |
| 6,533,884 B1 * | 3/2003 | Mallik | 156/209 |
| 6,828,065 B1 * | 12/2004 | Munshi | 429/309 |
| 6,872,459 B1 * | 3/2005 | Frisk et al. | 428/474.4 |
| 6,984,278 B1 * | 1/2006 | Anderson et al. | 156/209 |
| 2003/0070391 A1 * | 4/2003 | Tachauer et al. | 52/745.21 |

OTHER PUBLICATIONS

Co-pending U.S. Appl. No. 10/253,857, filed Sep. 24, 2002.
Co-pending U.S. Appl. No. 09/965,641, filed Sep. 27, 2001.
Co-pending U.S. Appl. No. 10/745,958, filed Dec. 28, 2002.

* cited by examiner

FIG. 3
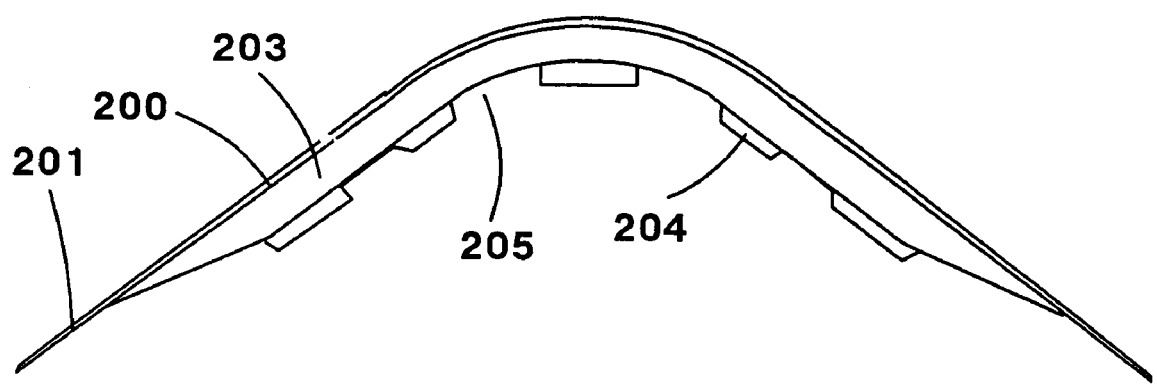
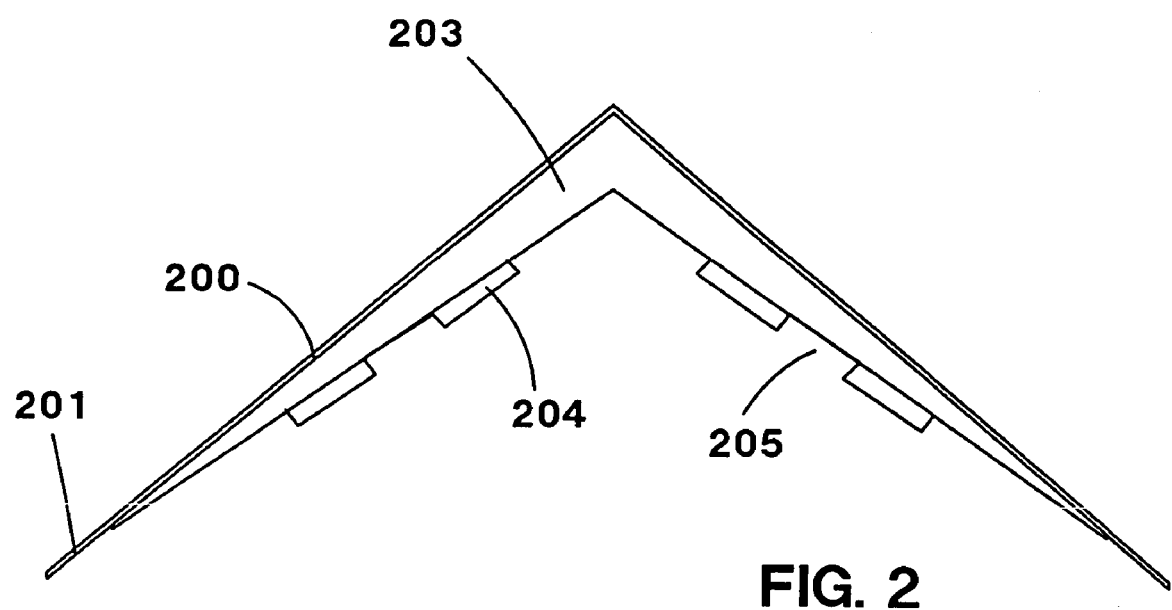
FIG. 2

DRYWALL FINISHING SYSTEM

CROSS REFERENCE

This application is a continuation of application Ser. No. 10/113,851, filed Mar. 29, 2002, now abandoned which was a continuation-in-part of application Ser. No. 09/539,402 filed Mar. 31, 2000, now abandoned. That application was a continuation-in-part of application Ser. No. 09/191,861 filed Nov. 12, 1998, now U.S. Pat. No. 6,148,573. Application Ser. No. 09/191,861 (U.S. Pat. No. 6,148,573) was a continuation-in-part of two applications, both of which are abandoned: Ser. No. 08/718,137 filed Sep. 18, 1996 and Ser. No. 08/832,470 filed Apr. 2, 1997. Both of these applications were continuations-in-part of parent application Ser. No. 08/544,339 filed Oct. 17, 1995, now abandoned.

BACKGROUND

1. Field of the Invention

This invention relates generally to the field drywall construction and more particularly to a system of exterior and interior drywall seams and corners that greatly reduces the amount of time, labor and material required to finish a modern structure.

2. Description of Related Art

The use of gypsum drywall board in modern construction is well known. Manufactured drywall sheets are nailed to studs to form interior walls and ceilings. Before these sheets can be painted or textured, the joints must be taped and sealed with joint sealing compound (drywall mud). Drywall tape is a porous fibrous material, usually paper, which is designed to permanently bond with drywall mud.

Taping also (known as stringing) is a tedious process. First, mud and tape must be applied by hand or dispensed with a tool known as a bazooka. The worker rolls and glazes the tape while the mud is wet. As the tape strings out, it has a tendency to pull in the direction of motion. After the tape is applied, it is coated with additional mud and the edges are feathered with a wide blade drywall knife to form a smooth transition between the seam and the wall. The mud is then allowed to dry, typically overnight. Next, the seam is sanded, re-coated with mud, dried and sanded again. The process is repeated if necessary until a smooth seam is produced.

Corners present a special problem. Inside corners are finished using drywall tape in much the same manner as flat joints. Outside corners are typically finished with corner beads.

Corner beads are either sharp edged or rounded nose, also known as "bullnose." These are used on exterior corners at windows and other openings. To use a standard corner bead, it first must be cut from a standard length of 8 feet or 10 feet. The bead is nailed into position using short nails approximately every foot. The worker must: 1) keep the bead plumb or level, and 2) keep the bead at the proper angle to prevent slipping too far to one side or the other. If this latter condition occurs, a "shiner", as it is called in the trade, results. This is where the bead is too far toward one side of the corner making the other side flange hard to coat.

Once the bead is installed, the worker must "first coat" the bead. This means to coat it with mud for the first time. This is very labor intensive, and it uses a large amount of mud. The bead projects outwardly from the corner. Accordingly, when a first coat is applied, a wedge of mud is formed which is thickest at the bead and tapers out to meet the wall. After the first coat, the mud is allowed to dry. Drying takes about a day.

After the "first coat" is dry throughout the building, the worker has to sand this coat of mud and clean all the metal edges. This is especially difficult with bullnose bead. After the "first coat" is sanded, the worker proceeds to "second coat" the bead repeating the entire process again and waiting another day to dry. The worker finally must again sand the bead carefully looking for imperfections, and touching these up. At this point, the bead is ready for texture or paint. The entire process uses considerable mud, and is very labor intensive, especially the sanding. In terms of total construction time, it requires two to three days to complete all the corners of a typical residence.

An alternative to fixed corner beads, especially for corners that do not meet at 90 degrees is a product known as "flex bead." Flex bead consists of two thin strips of metal bonded to a two inch paper tape. To use "flex bead", a worker first spreads all-purpose mud along the wallboard on both sides of the angle. A length of "flex bead" is folded by hand to create a crease. The bead is then installed in the angle. This requires a good eye for straight lines since the "flex bead" will not make a straight line by itself. The worker must move the bead around to the best of his abilities to set it as straight as possible. On many occasions, the worker will end up with a line that is not straight; this condition is called "snaking".

Once the "flex bead" is installed and dry, the first coat procedure is started. Most journeymen only coat one side of the angle at a time. If one tries to coat both sides at the same time, the mud flops over to the other side, and the knife digs a line into the mud on the other side of the angle. Therefore, the following process is usually used: 1) Apply a first coat of mud to one side and wait until it is dry; 2) Apply a first coat of mud to the other side and wait until it is dry; 3) Sand both sides and clean at the crease; 4) Apply a second coat of mud to one side and wait until it is dry; 5) Apply a second coat of mud to the other side and wait until it is dry; 6) Sand and touch up both sides. This process is tedious, and requires considerable time while the respective sides are drying. Accordingly, considerable drawbacks remain unsatisfied.

What is badly needed is a system for finishing drywall on the interior of buildings that avoids the difficulties of taping, corner beads and "flex bead" while retaining the perfect finished appearance that is required for texturing or painting. The sanding steps should be reduced or eliminated. This system should reduce the labor to less than one day for a typical residence and significantly reduce the amount of mud used.

SUMMARY OF THE INVENTION

The present invention relates to a drywall finishing system for finishing 1) inside and outside corners of any angle, 2) stub, end or closet walls, 3) window wrap corners, and 4) L-member for window sills and areas where a drywall ends against another surface e.g. brick. In addition, the system includes accessory products for each of the pieces mentioned.

The drywall finishing system of the invention in its most basic form is an elongated, preformed trim piece comprising a semi-rigid member having two flanges and inner and outer surfaces. The inner surface is provided with bonding means for continuously bonding the semi-rigid member to the drywall. The outer surface of the finishing member is provided with finishing means adapted to receive paint or other texture. The flanges of the semi-rigid member can be tapered in a lateral direction, being thickest at the center and tapering to a thin edge.

A first preferred embodiment is a flexible trim piece, comprising a semi-ridged member having two flanges, each of the flanges being tapered to a thin lateral edge. The semi-rigid member has a longitudinal groove between the flanges forming a hinge. A covering material is bonded to the inside surface of the semi-rigid member. The covering material is preferably drywall tape for forming a good continuous bond with drywall mud between the trim piece and the drywall. A finishing material is bonded to the exterior surface of the semi-rigid member. The finishing material is preferably a fibrous material such as a paper which is suitable for directly receiving paint or other texture. The finishing material may desirably extend laterally beyond the respective side edges of the semi-rigid member forming side tabs.

The present invention is placed on top of a coat of applied mud at the corner. The corner can be an exterior or interior angle. No nails are required, since the invention pieces stick to the mud. The exterior finishing material is paper, plastic, or other suitable material for receiving texture or paint with the preferred material being cup stock paper. The present invention eliminates most of the intense labor associated with present methods since none of the parts need to be coated with mud or sanded. In addition, the parts form straight, finished lines and angles as soon as they are installed.

Additional embodiments of the invention include right angle outside corner trim pieces, bullnose outside corner trim pieces, stub or end wall trim pieces, U-shaped and V-shaped joint pieces, and other trim and specialty pieces.

A particular embodiment of the present invention uses an elongated semi-rigid central member extruded with a single outer layer of fibrous material. The semi-rigid member forms two flanges. The semi-rigid member can contain a longitudinal groove from end to end that allows folding around the groove as a hinge. This is particularly suited to interior corners. The outer fibrous layer, with cup-stock paper being preferred, receives paint or texture directly with the need of sanding. The outer fibrous layer can end at the edges of the semi-rigid member, or can extend beyond the semi-rigid member to form wings. The semi-rigid member can be tapered from a center thickness to a thin edge for easy feathering.

The rear, or wall side, of the flanges of this embodiment can contain ridges, or protrusions (or grooves) of any pattern to better adhere to the wet mud first placed on the joint. Lateral, vertical, crisscross, hatched, or diagonal ridges or grooves can be used. Some preferred patterns are wave patterns, cross-hatch, vertical pointed protrusions, and vertical rectangular protrusions. These protrusions, ridges or grooves give the product a non-slip property when it is place on wet drywall mud behind the product. The method of installing is to place wet drywall mud on both sides of the joint; place the finishing product of the present invention into this mud. The protrusions prevent it from slipping. The edges of the product can then be feathered with a small amount of mud, and the system is complete. After the mud is dry, the entire product can be directly painted or textured with the fibrous surface layer directly receiving paint or texture.

These advantages and other advantages of the present invention will become more fully apparent from the following detailed description when read in conjunction with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention.

FIG. 2 is an end-view of a pointed outside corner embodiment of the present invention where there is no inner layer fibrous of material, and there are rectangular protrusions from the semi-rigid member.

FIG. 3 is an end-view of the bullnose corner embodiment of the present invention where there is no inner layer of fibrous material, and there are rectangular protrusions from the semi-rigid member.

DETAILED DESCRIPTION

Figure 1:
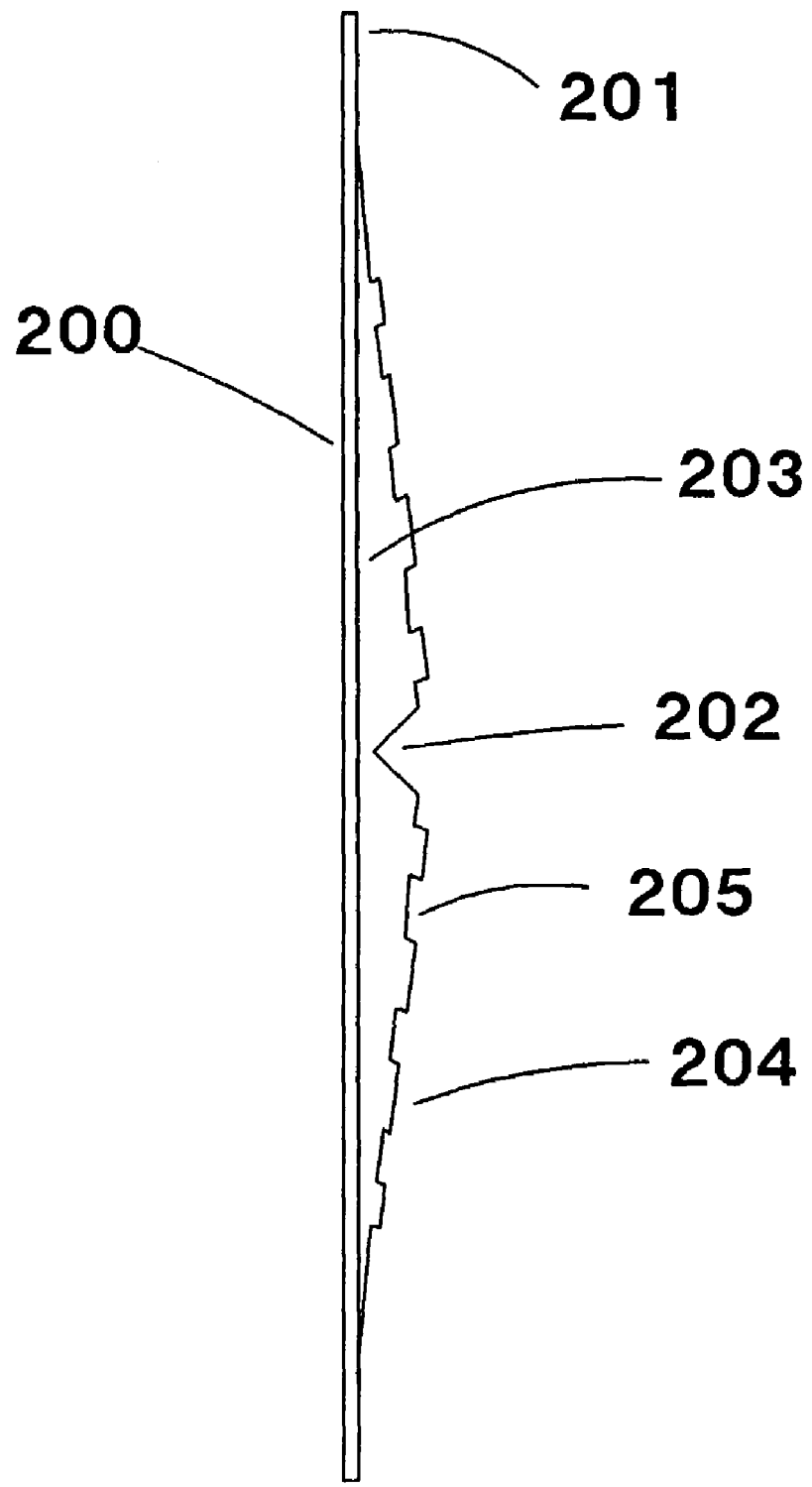
FIG. 1 is an end-view of the flexible trim embodiment of the present invention where there is no inner layer of fibrous material, and there are rectangular protrusions from the semi-rigid layer.

FIGS. 1–4 show embodiments of the present invention which contain no separate inner layer of material next to the wallboard. These embodiments (flex—FIG. 1, outside corner—FIG. 2, and bullnose—FIG. 3) are laminate with only two layers tightly bonded during extrusion. There is a semi-rigid member 203 that is continuously extruded with the outer layer of fibrous material as in other embodiments; however, instead of an inner layer, the semi-rigid member contains ridges 204 or grooves 205 or cross-hatch, or any other patterns that will cause the member to adhere to drywall mud. These embodiments include a layer of fibrous finishing material 200 that may overlap 201 the semi-rigid member 203 at the edges. The flex embodiment (FIG. 1) also includes a central grove 202 or hinge for flexing.

Figure 4:
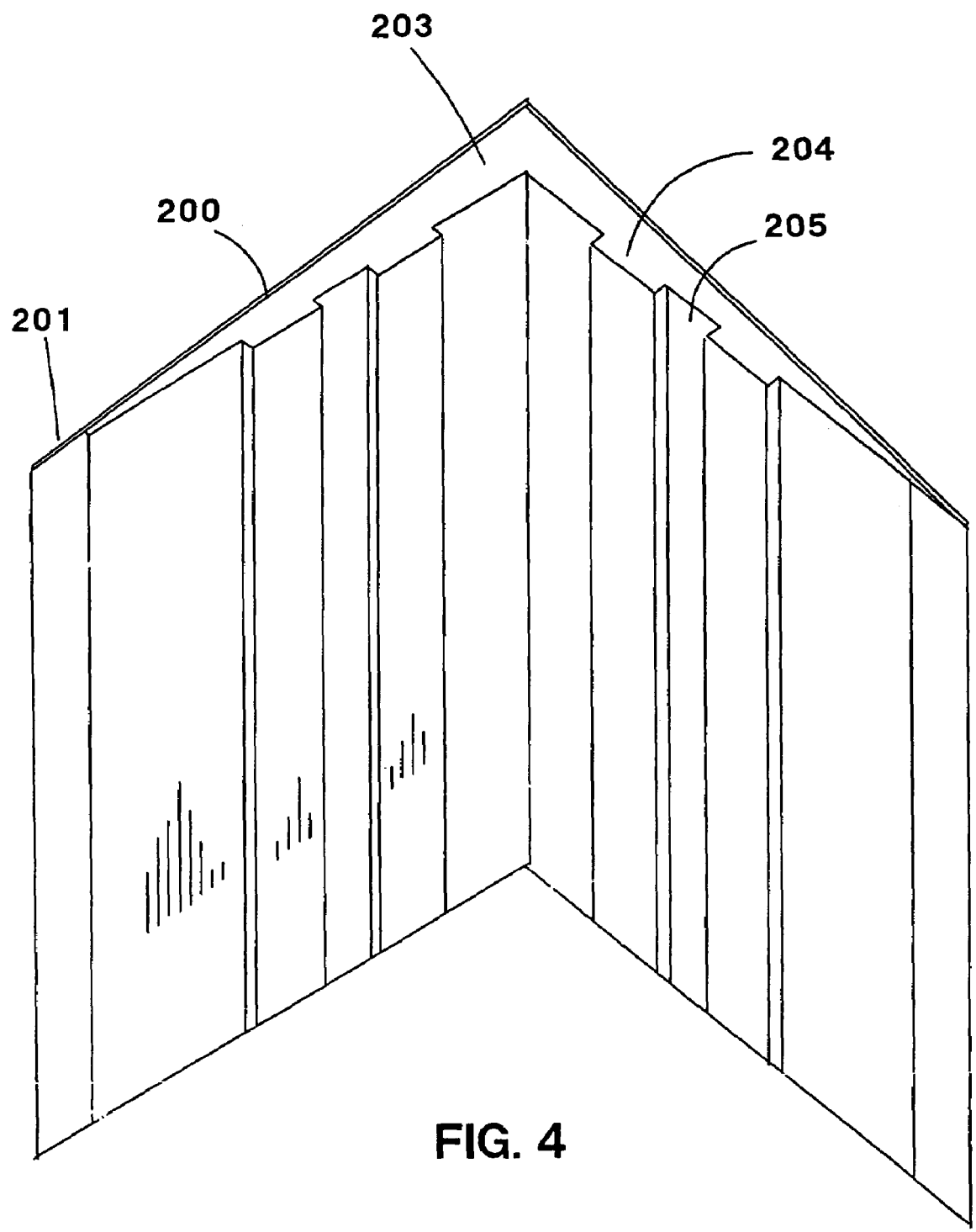
FIG. 4 is a perspective view of the embodiment of FIG. 2.

FIG. 4 shows a perspective view of the piece from FIG. 2. It can be clearly seen that in this embodiment, ridges 204 and/or grooves 205 continue longitudinally down the piece. As stated, it is not necessary that these ridges and/or grooves run longitudinally; they can run laterally, crosswise, form a cross-hatch pattern, diagonally or run any other way that allows adherence of the piece to wet mud. It is also within the scope of the present invention to have a random pattern of ridges, grooves, or protrusions. Also, in any of these embodiments, the ridges, groves, or protrusions need not be continuous, but can be broken, or form any pattern.

Figure 5:
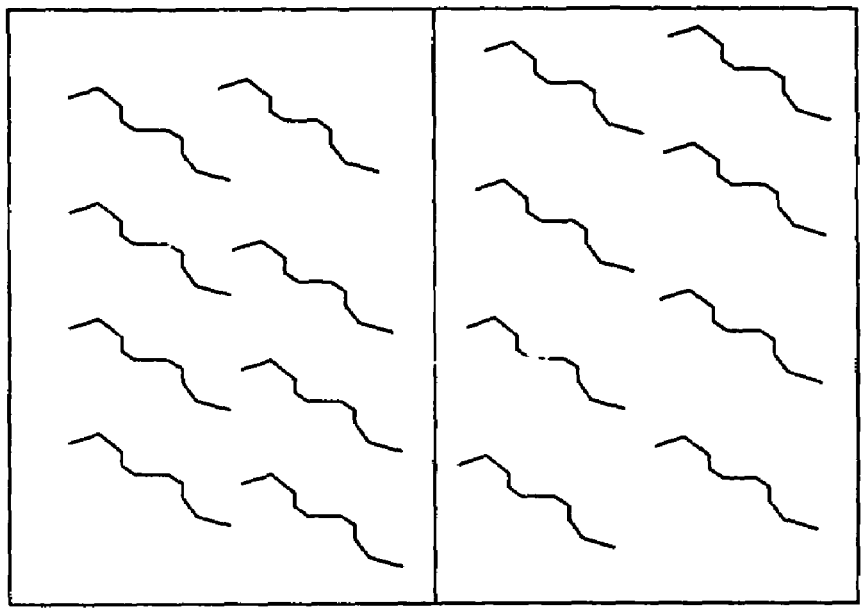
FIGS. 5 and 6 show a wave pattern and a cross-hatch pattern for protrusions.
Figure 6:
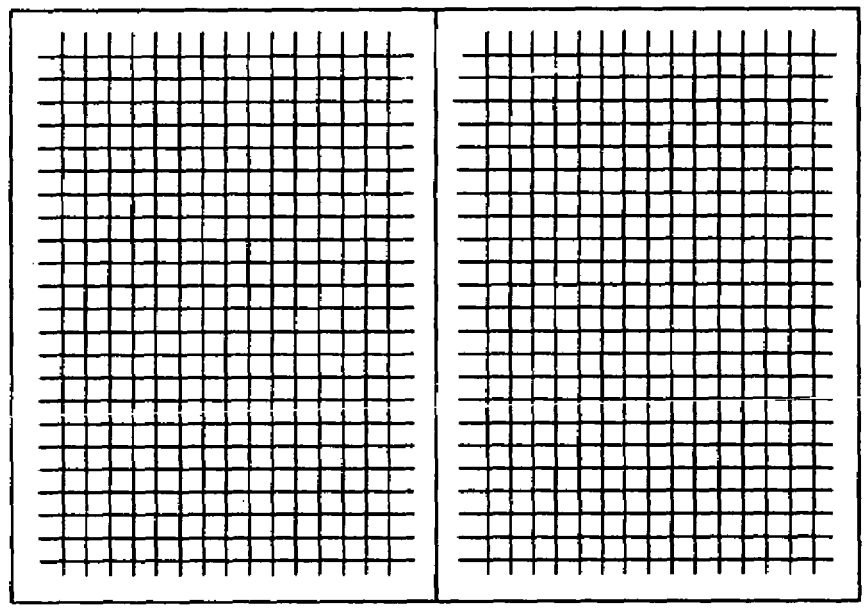

The patterns of ridges or protrusions can take any pattern including a random pattern. In particular, FIG. 5 shows a wave pattern, and FIG. 6 shows a cross-hatch pattern. Different patterns give different degrees of holding power on wet mud. It is also possible to drill round holes in the flanges for further holding power.

Figure 7:
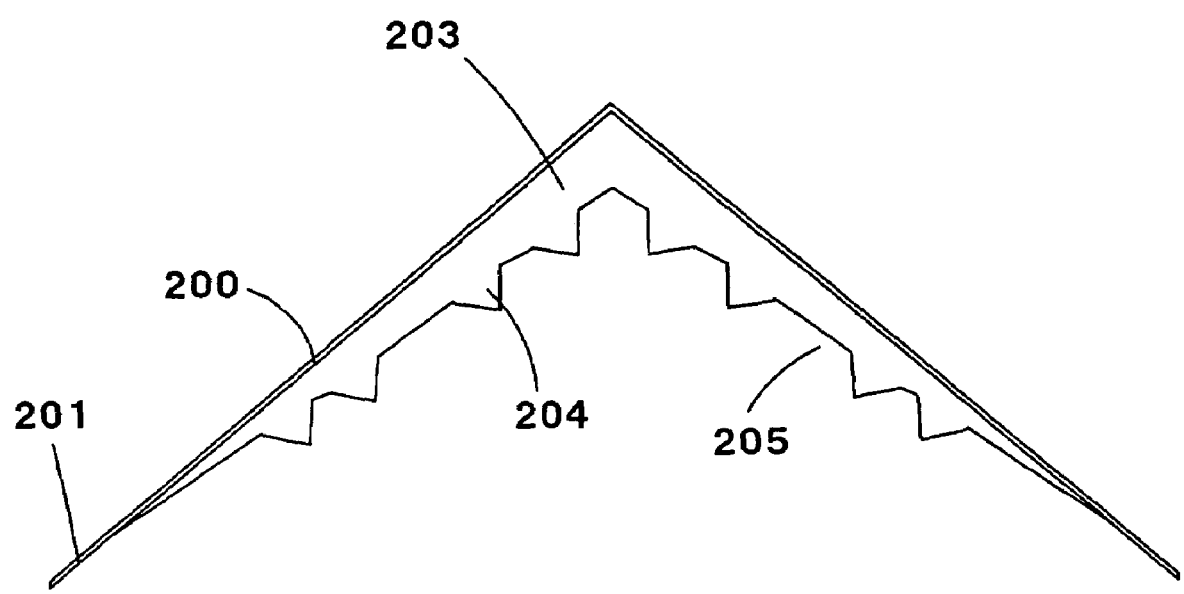
FIG. 7 shows vertical pointed protrusions.

FIG. 7 shows an exterior embodiment of the present invention with a pattern of vertical pointed protrusions 204 with possible flat areas 205 between the protrusions. Again the semi-rigid member 203 and an outer fibrous layer 200 are continuously extruded together. The tip of the fibrous layer 201 can be longer than the semi-rigid member 203 in the form of an extending wing, or it can end at the same point as the semi-rigid member. The preferred material for the fibrous layer 200 is cup stock paper, and the preferred material for the semi-rigid member 203 is high impact polystyrene plastic.

The key to this series of embodiments (FIGS. 1–4) is that they do not have or need any inner material layer. Patterns or combinations of ridges, protrusions, or cross-hatch, or any other pattern on the surface of, or part of, the semi-rigid member cause the unit to adhere to wet drywall mud as it is pressed into place. This embodiment removes the need for a third layer of material in the laminate (the inner material layer).

It should be realized that in all embodiments thus far presented of the present invention, the outer material layer or finishing layer can also, optionally, be sprayed on during the pre-forming process. The normal and preferred method or process of producing the present invention consists of continuously extruding the semi-rigid member, the inner material layer (if it is present), and the outer finishing material layer as a laminated, preformed piece. Therefore, spraying on an outer or inner material layer is optional.

While the preferred embodiments of the present invention have been shown and described, it is to be understood that various modifications and changes could be made thereto without departing from the scope of the present invention.

What is claimed is:

1. A process for producing a no-coat finishing product comprising the steps of:
    co-extruding a plastic layer and finishing paper layer to form an elongated semi-rigid structural piece, said structural piece having a plastic back and a finishing paper front, said finishing paper front prepared to directly receive paint or texture;
    producing protrusions on said plastic back, whereby said structural piece is held in place by wet drywall mud; and,
    wherein said plastic layer is high-impact plastic.

2. The method of claim 1 wherein said finishing paper is cup stock paper.

3. The method of claim 1 wherein said protrusions are pointed.

4. The method of claim 1 wherein said protrusions form a cross-hatch pattern.

5. The method of claim 1 wherein said protrusions form a wave pattern.

6. The method of claim 1 wherein said protrusions run from edge to edge on said plastic back.

7. The method of claim 1 wherein said protrusions run lengthwise along said plastic back.

* * * * *